United States Patent
Shimada

(10) Patent No.: US 7,196,345 B2
(45) Date of Patent: Mar. 27, 2007

(54) STIMULABLE PHOSPHOR SHEET ERASING METHOD AND APPARATUS

(75) Inventor: Katsumi Shimada, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 191 days.

(21) Appl. No.: 11/074,799

(22) Filed: Mar. 9, 2005

(65) Prior Publication Data

US 2005/0199837 A1   Sep. 15, 2005

(30) Foreign Application Priority Data

Mar. 10, 2004   (JP)   ............... 2004-067015

(51) Int. Cl.
*G03B 42/08*   (2006.01)
(52) U.S. Cl. ............................................. 250/588
(58) Field of Classification Search ............... 250/588
See application file for complete search history.

(56) References Cited

U.S. PATENT DOCUMENTS 4,590,369 A * 5/1986 Horikawa ............... 250/252.1
5,530,261 A   6/1996 Yasuda
2003/0178590 A1 * 9/2003 Yasuda et al. ............. 250/587

FOREIGN PATENT DOCUMENTS

| JP | 10-339920 A | 12/1998 |
|---|---|---|
| JP | 2002-296713 A | 10/2002 |
| JP | 2003-295364 A | 10/2003 |

* cited by examiner

*Primary Examiner*—David Porta
*Assistant Examiner*—Christopher Webb
(74) *Attorney, Agent, or Firm*—Sughrue Mion, PLLC

(57) ABSTRACT

A quantity of imparted erasing energy, which is to be imparted to a stimulable phosphor sheet in order to erase residual radiation energy remaining on the stimulable phosphor sheet, is adjusted by use of an image recording sensitivity in a next radiation image recording operation, which is to be performed on the stimulable phosphor sheet, and an energy level of the residual radiation energy remaining on the stimulable phosphor sheet. The quantity of the imparted erasing energy is adjusted such that, as the image recording sensitivity in the next radiation image recording operation, which is to be performed on the stimulable phosphor sheet, becomes high, and as the energy level of the residual radiation energy remaining on the stimulable phosphor sheet becomes high, the quantity of the imparted erasing energy is set to be large.

10 Claims, 5 Drawing Sheets

STIMULABLE PHOSPHOR SHEET ERASING METHOD AND APPARATUS

BACKGROUND OF THE INVENTION

1. Field of the Invention

This invention relates to a stimulable phosphor sheet erasing method and apparatus. This invention particularly relates to a stimulable phosphor sheet erasing method and apparatus, in which residual radiation energy remaining on a stimulable phosphor sheet is erased such that the erased stimulable phosphor sheet becomes capable of being used for a next radiation image recording operation.

2. Description of the Related Art

Radiation image recording and reproducing systems utilizing stimulable phosphors have heretofore been known. With the radiation image recording and reproducing systems utilizing the stimulable phosphors, radiation carrying image information of an object, such as a human body, is irradiated to a sheet containing a stimulable phosphor (hereinbelow referred to as the stimulable phosphor sheet), and a radiation image of the object is thus stored on the stimulable phosphor sheet. The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during the exposure of the stimulable phosphor sheet to the radiation. The light emitted by the stimulable phosphor sheet is photoelectrically detected, and an image signal representing the radiation image of the object is thereby acquired.

In the radiation image recording and reproducing systems described above, after the radiation image has been read out from the stimulable phosphor sheet, erasing light having wavelengths falling within a wavelength range of visible light is irradiated to the stimulable phosphor sheet, and residual radiation energy remaining on the stimulable phosphor sheet is thereby released. The thus erased stimulable phosphor sheet is again used for the recording of a radiation image.

In such cases, it often occurs that, on the erased stimulable phosphor sheet from which the residual radiation energy has been released, part of the residual radiation energy remains even further without being released perfectly during the erasing operation. The residual radiation energy remaining even further on the stimulable phosphor sheet without being released perfectly during the erasing operation is the energy due to the radiation image, which was recorded on the stimulable phosphor sheet in the manner described above. If the energy level of the residual radiation energy remaining even further on the stimulable phosphor sheet without being released perfectly during the erasing operation is higher than a negligible level, and the stimulable phosphor sheet, on which the energy level of the residual radiation energy is higher than the negligible level, is subjected to a next radiation image recording operation for the recording of a radiation image of an object, the residual radiation energy remaining on the stimulable phosphor sheet will cause a residual image to occur in a radiation image, which is reproduced from an image signal having been read out from the stimulable phosphor sheet having been subjected to the next radiation image recording operation. The residual image constitutes noise in the reproduced radiation image.

Therefore, there have been proposed various techniques for adjusting the level of erasing energy for the erasing of the stimulable phosphor sheet such that the residual image may not appear in the reproduced radiation image. For example, techniques for adjusting the quantity of imparted erasing energy in accordance with the level of residual radiation energy remaining on a stimulable phosphor sheet have been proposed in, for example, U.S. Pat. No. 5,530,261 and Japanese Unexamined Patent Publication No 2003-295364. Also, a technique for setting the quantity of imparted erasing energy to be large or performing an additional erasing operation for a stimulable phosphor sheet in cases where a next radiation image recording operation, which is to be performed on the stimulable phosphor sheet, is a high-sensitivity radiation image recording operation has been proposed in, for example, Japanese Unexamined Patent Publication No. 10(1998)-340920. Further, a technique for adjusting erasing energy in accordance with a radiation dose, which has been delivered from a radiation source in a radiation image recording operation that has been performed most recently on a stimulable phosphor sheet, and the radiation dose, which is expected to be delivered from the radiation source in a next radiation image recording operation that is to be performed on the stimulable phosphor sheet, has been proposed in, for example, Japanese Unexamined Patent Publication No. 2002-296713.

In cases where the energy level of the residual radiation energy, which remains even further on the stimulable phosphor sheet after an erasing operation has been performed on the stimulable phosphor sheet, (hereinbelow referred to as the after-erasing radiation energy) is sufficiently lower than the energy level of radiation energy, which is expected to be stored on the stimulable phosphor sheet with the next radiation image recording operation, the residual image due to the after-erasing radiation energy is capable of being rendered imperceptible or invisible in the reproduced radiation image. Also, in cases where the quantity of imparted erasing energy is set to be large such that the energy level of the after-erasing radiation energy may become low, the problems occur in that the service life of an erasing lamp becomes short, or in that the image recording throughput rate becomes low. Specifically, in order for the energy level of the erasing energy to be set to be high, it is necessary that the light quantity of the erasing light be set to be large, or that the erasing light irradiation time be set to be long. However, in cases where the light quantity of the erasing light is set to be large, the problems occur in that the service life of the erasing lamp becomes short. Also, in cases where the erasing light irradiation time is set to be long, the image recording throughput rate becomes low. Therefore, in cases where the erasing operation is to be performed on the stimulable phosphor sheet, it is desired that an appropriate quantity of erasing energy, which quantity is not excessively large and is not insufficient, be imparted to the stimulable phosphor sheet.

It is desired that the ratio of the energy level of the after-erasing radiation energy (i.e., the energy level of the residual radiation energy remaining on the stimulable phosphor sheet at the time at which the next radiation image recording operation is to be performed on the stimulable phosphor sheet) to the energy level of the radiation energy, which is expected to be stored on the stimulable phosphor sheet with the next radiation image recording operation, falls within an appropriate range, such that the radiation image, which is reproduced from the image signal having been read out from the stimulable phosphor sheet having been subjected to the next radiation image recording operation, may be substantially free from the residual image, and such that the residual radiation energy remaining on the stimulable phosphor sheet may not be erased excessively. The appropriate range of the ratio described above will hereinbelow be referred to as the appropriate erasing ratio range.

However, with the conventional erasing techniques, the adjustment of the quantity of imparted erasing energy is not performed through sufficient consideration of the ratio of the energy level of the after-erasing radiation energy to the energy level of the radiation energy, which is expected to be stored on the stimulable phosphor sheet with the next radiation image recording operation. Therefore, with the conventional erasing techniques, it often occurs that an excessively large quantity of the erasing energy is imparted to the stimulable phosphor sheet.

SUMMARY OF THE INVENTION

The primary object of the present invention is to provide a stimulable phosphor sheet erasing method, wherein residual radiation energy remaining on a stimulable phosphor sheet, which is to be used iteratively for radiation image recording operations, is capable of being erased efficiently.

Another object of the present invention is to provide an apparatus for carrying out the stimulable phosphor sheet erasing method.

The present invention provides a stimulable phosphor sheet erasing method, in which residual radiation energy remaining on a stimulable phosphor sheet is erased such that the erased stimulable phosphor sheet becomes capable of being used for a next radiation image recording operation, the method comprising the steps of:

i) detecting an energy level of the residual radiation energy remaining on the stimulable phosphor sheet, ii) acquiring information representing an image recording sensitivity in the next radiation image recording operation, which is to be performed on the stimulable phosphor sheet, and iii) adjusting a quantity of imparted erasing energy, which is to be imparted to the stimulable phosphor sheet in order to erase the residual radiation energy remaining on the stimulable phosphor sheet, by use of both the image recording sensitivity in the next radiation image recording operation, which is to be performed on the stimulable phosphor sheet, and the energy level of the residual radiation energy remaining on the stimulable phosphor sheet, the quantity of the imparted erasing energy being adjusted such that, as the image recording sensitivity in the next radiation image recording operation, which is to be performed on the stimulable phosphor sheet, becomes high, and as the energy level of the residual radiation energy remaining on the stimulable phosphor sheet becomes high, the quantity of the imparted erasing energy is set to be large.

The stimulable phosphor sheet erasing method in accordance with the present invention may be modified such that a maximum value of energy levels of the residual radiation energy remaining on the stimulable phosphor sheet is taken as the energy level of the residual radiation energy remaining on the stimulable phosphor sheet.

Also, the stimulable phosphor sheet erasing method in accordance with the present invention may be modified such that the quantity of the imparted erasing energy is adjusted in stages with respect to the image recording sensitivity in the next radiation image recording operation, which is to be performed on the stimulable phosphor sheet, and the energy level of the residual radiation energy remaining on the stimulable phosphor sheet.

The present invention also provides a stimulable phosphor sheet erasing apparatus, in which residual radiation energy remaining on a stimulable phosphor sheet is erased such that the erased stimulable phosphor sheet becomes capable of being used for a next radiation image recording operation, the apparatus comprising:

i) erasing energy imparting means for imparting erasing energy, which acts to erase the residual radiation energy remaining on the stimulable phosphor sheet, to the stimulable phosphor sheet, ii) detection means for detecting an energy level of the residual radiation energy remaining on the stimulable phosphor sheet, iii) sensitivity acquiring means for acquiring information representing an image recording sensitivity in the next radiation image recording operation, which is to be performed on the stimulable phosphor sheet, and iv) erasing energy setting means for adjusting a quantity of the imparted erasing energy, which is to be imparted by the erasing energy imparting means to the stimulable phosphor sheet, by use of both the image recording sensitivity in the next radiation image recording operation, which image recording sensitivity has been acquired by the sensitivity acquiring means, and the energy level of the residual radiation energy remaining on the stimulable phosphor sheet, which energy level has been detected by the detection means, the erasing energy setting means adjusting the quantity of the imparted erasing energy such that, as the image recording sensitivity in the next radiation image recording operation, which image recording sensitivity has been acquired by the sensitivity acquiring means, becomes high, and as the energy level of the residual radiation energy remaining on the stimulable phosphor sheet, which energy level has been detected by the detection means, becomes high, the quantity of the imparted erasing energy is set to be large.

The stimulable phosphor sheet erasing apparatus in accordance with the present invention may be modified such that the detection means detects a maximum value of energy levels of the residual radiation energy remaining on the stimulable phosphor sheet and takes the detected maximum value as the energy level of the residual radiation energy remaining on the stimulable phosphor sheet.

Also, the stimulable phosphor sheet erasing apparatus in accordance with the present invention may be modified such that the erasing energy setting means adjusts the quantity of the imparted erasing energy in stages with respect to the image recording sensitivity in the next radiation image recording operation, which is to be performed on the stimulable phosphor sheet, and the energy level of the residual radiation energy remaining on the stimulable phosphor sheet.

Further, the stimulable phosphor sheet erasing apparatus in accordance with the present invention may be modified such that the erasing energy setting means is provided with a data table, which defines the quantity of the imparted erasing energy.

With the stimulable phosphor sheet erasing method and apparatus in accordance with the present invention, the quantity of the imparted erasing energy, which is to be imparted to the stimulable phosphor sheet in order to erase the residual radiation energy remaining on the stimulable phosphor sheet, is adjusted by use of both the image recording sensitivity in the next radiation image recording operation, which is to be performed on the stimulable phosphor sheet, and the energy level of the residual radiation energy remaining on the stimulable phosphor sheet. The quantity of the imparted erasing energy is adjusted such that, as the image recording sensitivity in the next radiation image recording operation, which is to be performed on the stimulable phosphor sheet, becomes high, and as the energy level of the residual radiation energy remaining on the stimulable phosphor sheet becomes high, the quantity of the imparted erasing energy is set to be large. Therefore, with the stimulable phosphor sheet erasing method and apparatus in accordance with the present invention, the ratio of the energy level of the after-erasing radiation energy to the energy level of the radiation energy, which is expected to be stored on the stimulable phosphor sheet with the next radiation image recording operation, is capable of being set accurately so as to fall within the appropriate erasing ratio range described above. Accordingly, the residual radiation energy remaining on the stimulable phosphor sheet is capable of being erased efficiently, such that an unnecessarily long time may not be required to perform the erasing operation, and such that excessive erasing energy may not be used.

Specifically, the energy level of the radiation energy, which is expected to be stored on the stimulable phosphor sheet with the next radiation image recording operation, is capable of being calculated in accordance with the image recording sensitivity in the next radiation image recording operation, which is to be performed on the stimulable phosphor sheet. Also, the energy level (Level 1) of the after-erasing radiation energy, which falls within the appropriate erasing ratio range with respect to the energy level of the radiation energy, which is expected to be stored on the stimulable phosphor sheet with the next radiation image recording operation, is capable of being set.

Therefore, after the erasing operation for lowering the energy level (Level 2) of the residual radiation energy remaining on the stimulable phosphor sheet to the energy level (Level 1) has been performed, a next high-sensitivity image recording operation may be performed. In this manner, the ratio of the energy level of the after-erasing radiation energy to the energy level of the radiation energy, which is expected to be stored on the stimulable phosphor sheet with the next radiation image recording operation, is capable of being set so as to fall within the appropriate erasing ratio range described above. Specifically, the quantity of the imparted erasing energy at the time at which the aforesaid erasing operation is to be performed may be set such that energy level of the residual radiation energy remaining on the stimulable phosphor sheet may be lowered from the aforesaid energy level (Level 2) to the energy level (Level 1). In this manner, the ratio of the energy level of the after-erasing radiation energy to the energy level of the radiation energy, which is expected to be stored on the stimulable phosphor sheet with the next radiation image recording operation, is capable of being set so as to fall within the appropriate erasing ratio range described above. Accordingly, as described above, the residual radiation energy remaining on the stimulable phosphor sheet is capable of being erased efficiently.

DESCRIPTION OF THE PREFERRED EMBODIMENTS

The present invention will hereinbelow be described in further detail with reference to the accompanying drawings.

Figure 1:
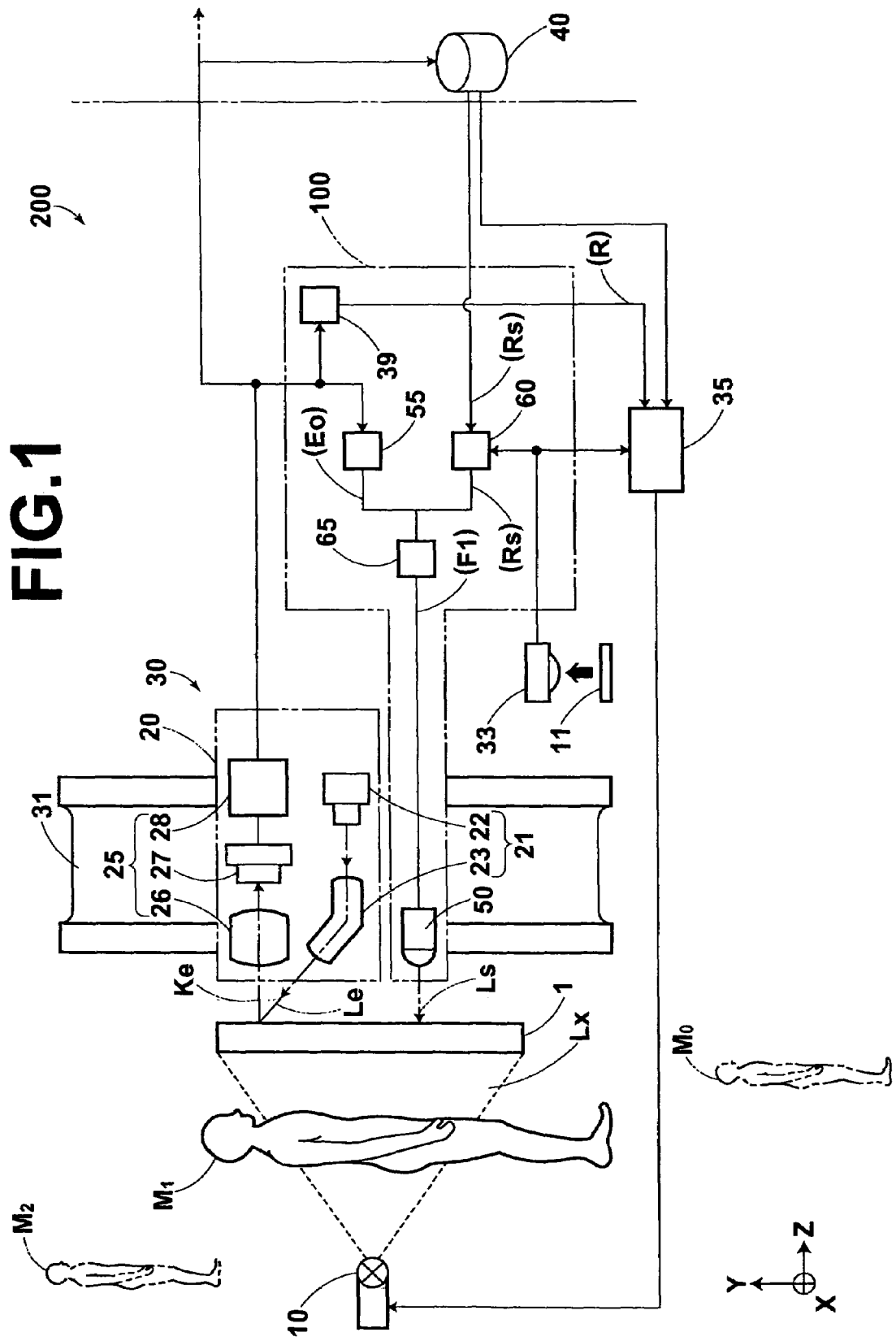
FIG. 1 is a schematic view showing an example of a radiation image recording and reproducing system, in which an embodiment of the stimulable phosphor sheet erasing apparatus in accordance with the present invention is employed.
Figure 2:
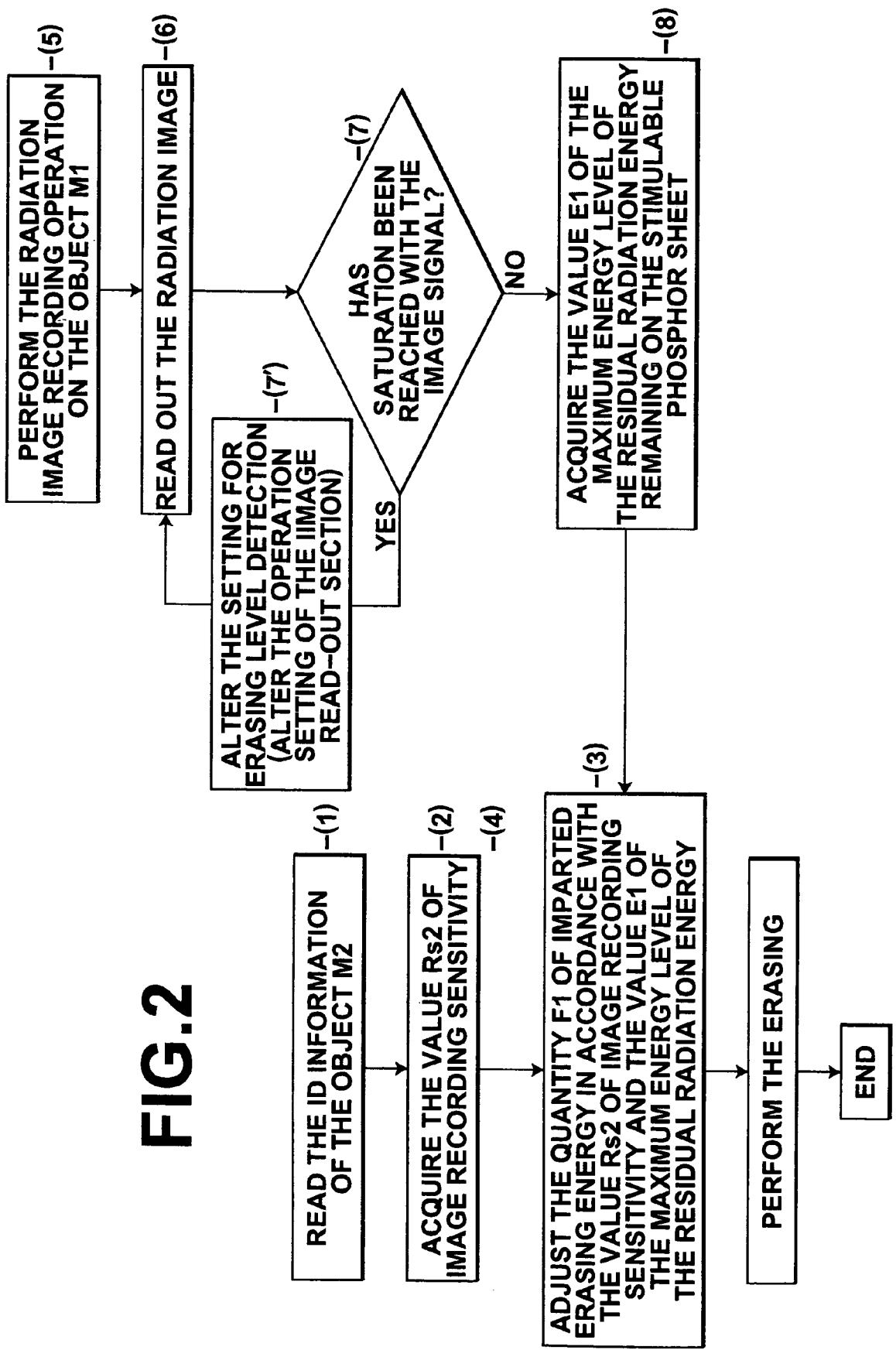
FIG. 2 is a flow chart showing how after-readout radiation energy remaining on a stimulable phosphor sheet is erased before a next radiation image recording operation is performed on the stimulable phosphor sheet.
Figure 3:
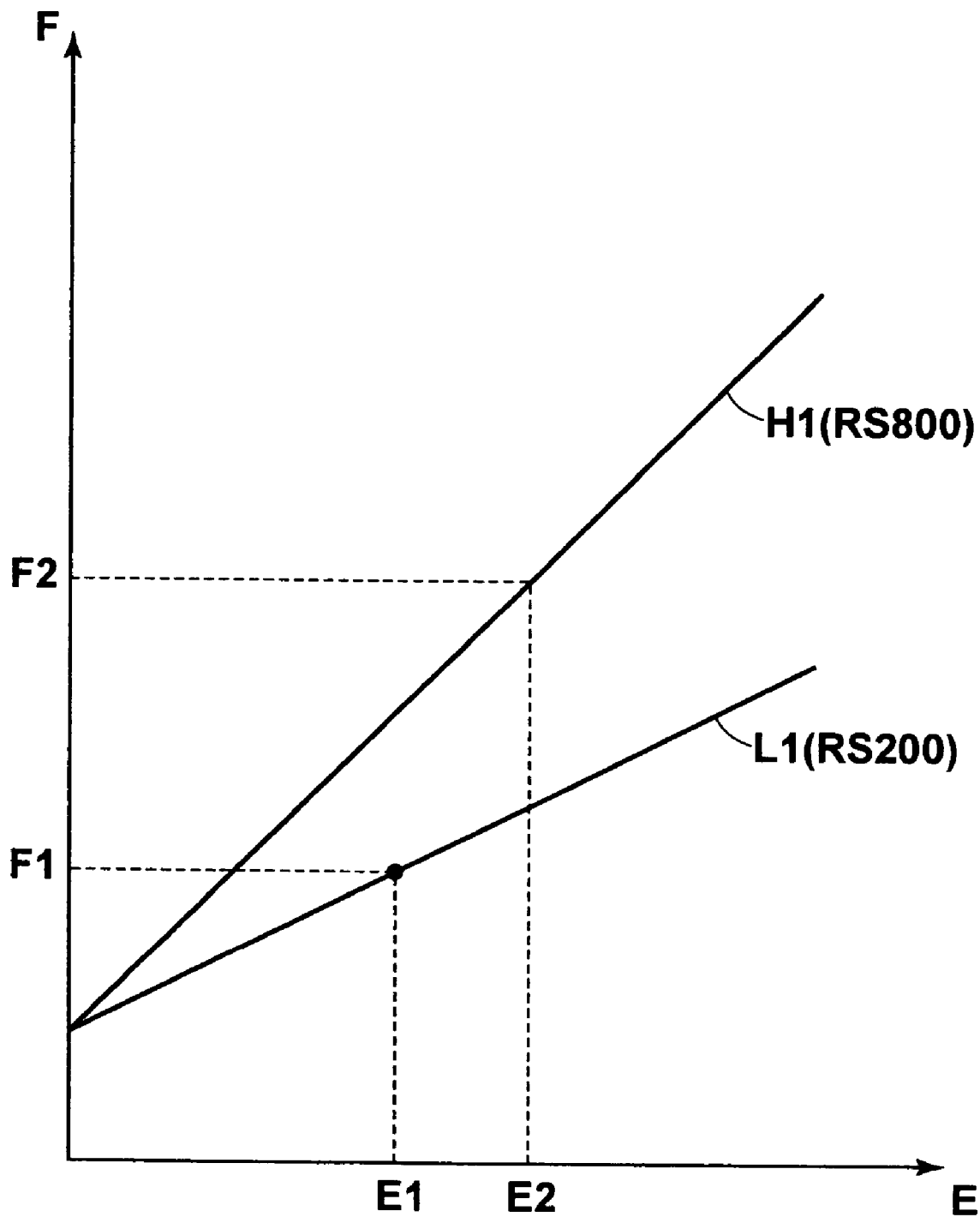
FIG. 3 is a graph showing a content of an example of a data table, which is utilized for adjusting a quantity of imparted erasing energy in accordance with an image recording sensitivity in a next radiation image recording operation, which is to be performed on a stimulable phosphor sheet, and a value of a maximum energy level of residual radiation energy remaining on the stimulable phosphor sheet.
Figure 4:
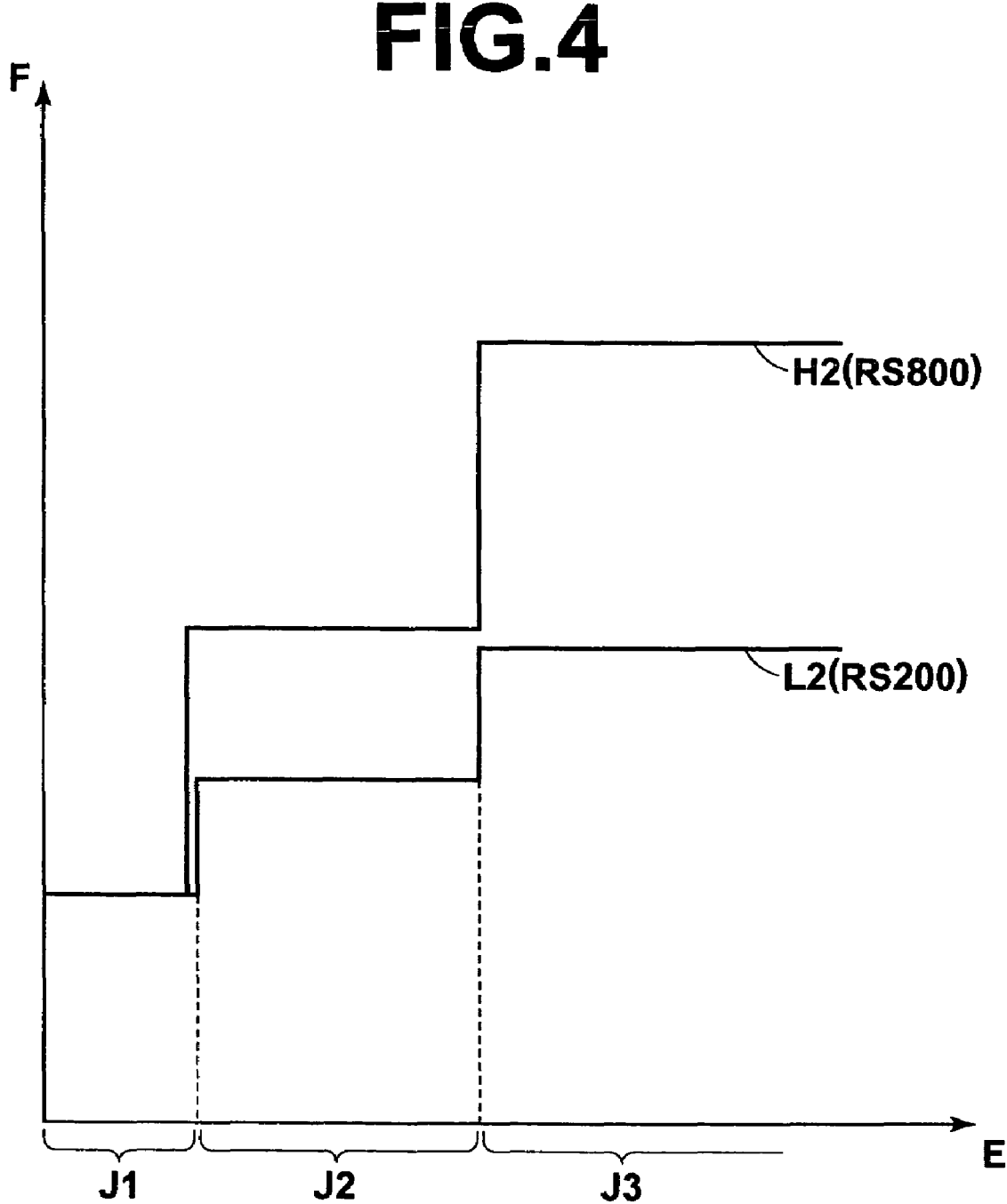
FIG. 4 is a graph showing a content of a different example of a data table, which is utilized for adjusting a quantity of imparted erasing energy in accordance with an image recording sensitivity in a next radiation image recording operation, which is to be performed on a stimulable phosphor sheet, and a value of a maximum energy level of residual radiation energy remaining on the stimulable phosphor sheet.

FIG. 1 is a schematic view showing an example of a radiation image recording and reproducing system, in which an embodiment of the stimulable phosphor sheet erasing apparatus in accordance with the present invention is employed. FIG. 2 is a flow chart showing how after-readout radiation energy remaining on a stimulable phosphor sheet is erased before a next radiation image recording operation is performed on the stimulable phosphor sheet. FIG. 3 is a graph showing a content of an example of a data table, which is utilized for adjusting a quantity of imparted erasing energy in accordance with an image recording sensitivity in a next radiation image recording operation, which is to be performed on a stimulable phosphor sheet, and a value of a maximum energy level of residual radiation energy remaining on the stimulable phosphor sheet. FIG. 4 is a graph showing a content of a different example of a data table, which is utilized for adjusting a quantity of imparted erasing energy in accordance with an image recording sensitivity in a next radiation image recording operation, which is to be performed on a stimulable phosphor sheet, and a value of a maximum energy level of residual radiation energy remaining on the stimulable phosphor sheet.

With reference to FIG. 1, a stimulable phosphor sheet erasing apparatus 100, which is an embodiment of the stimulable phosphor sheet erasing apparatus in accordance with the present invention, is used by being incorporated in a radiation image recording and reproducing system 200, which will be described later. The stimulable phosphor sheet erasing apparatus 100 erases residual radiation energy remaining on a stimulable phosphor sheet 1, such that the stimulable phosphor sheet 1 becomes capable of being used for a next radiation image recording operation. The residual radiation energy, which remains on the stimulable phosphor sheet 1 after a radiation image has been read out from the stimulable phosphor sheet 1 and before an erasing operation is performed on the stimulable phosphor sheet 1, will hereinbelow be referred to as the after-readout radiation energy.

The radiation image recording and reproducing system 200 comprises a radiation irradiating section 10 for irradiating radiation to an object M1 in order to perform a radiation image recording operation for recording a radiation image of the object M1 on the stimulable phosphor sheet 1. The radiation image recording and reproducing system 200 also comprises a radiation image acquiring section 20 for reading out the radiation image of the object M1 from the stimulable phosphor sheet 1, on which the radiation image of the object M1 has been stored with the irradiation of the radiation performed by the radiation irradiating section 10. The radiation image recording and reproducing system 200 further comprises the stimulable phosphor sheet erasing apparatus 100 for erasing the after-readout radiation energy remaining on the stimulable phosphor sheet 1, from which the radiation image has been read out by the radiation image acquiring section 20.

The radiation irradiating section 10 is constituted of a control section, which controls a radiation dose, and a radiation source, which produces the radiation by being controlled by the control section.

The radiation image acquiring section 20 reads out the radiation image of the object M1, which radiation image has been stored on the stimulable phosphor sheet 1 when the stimulable phosphor sheet 1 has been exposed to radiation Lx having been irradiated from the radiation source and carrying image information of the object M1. The radiation image acquiring section 20 comprises a stimulating ray irradiating section 21 for irradiating stimulating rays Le to the stimulable phosphor sheet 1, on which the radiation image of the object M1 has been stored. The stimulating rays Le cause the stimulable phosphor sheet 1 to emit light Ke in proportion to the amount of energy stored on the stimulable phosphor sheet 1 during the exposure of the stimulable phosphor sheet 1 to the radiation. The radiation image acquiring section 20 also comprises a read-out section 25 for detecting the light Ke, which is emitted by the stimulable phosphor sheet 1 when the stimulable phosphor sheet 1 is exposed to the stimulating rays Le, and outputting an image signal representing the radiation image of the object M1.

The stimulating ray irradiating section 21 comprises a laser beam source 22 for radiating out a laser beam. The stimulating ray irradiating section 21 also comprises an optical system 23 for irradiating the linear stimulating rays Le, which have been radiated out from the laser beam source 22, onto a linear region of the stimulable phosphor sheet 1, which linear region extends along a main scanning direction (indicated by the arrow X in FIG. 1).

The read-out section 25 comprises an optical system 26 for collecting the light Ke, which has been emitted by the linear region of the stimulable phosphor sheet 1, onto a linear region of a light receiving section 27, which is described below. The read-out section 25 also comprises the light receiving section 27 for receiving the emitted light Ke, which has been collected by the optical system 26, and performing photoelectric conversion of the emitted light Ke. The light receiving section 27 is constituted of a line sensor extending along the main scanning direction described above. The read-out section 25 further comprises an analog-to-digital converter 28 for converting an analog image signal, which has been obtained from the photoelectric conversion of the emitted light Ke performed by the light receiving section 27, into a digital image signal and outputting the thus obtained image signal.

The stimulable phosphor sheet erasing apparatus 100 comprises an erasing section 50, which acts as the erasing energy imparting means for imparting erasing energy for the erasing of the after-readout radiation energy, which remains on the stimulable phosphor sheet 1, to the stimulable phosphor sheet 1. The erasing section 50 irradiates erasing light Lg for imparting the erasing energy to the stimulable phosphor sheet 1. The stimulable phosphor sheet erasing apparatus 100 also comprises a residual radiation energy detecting section 55, which acts as the detection means for detecting an energy level of the after-readout radiation energy remaining on the stimulable phosphor sheet 1. The stimulable phosphor sheet erasing apparatus 100 further comprises a sensitivity acquiring section 60 for acquiring information representing an image recording sensitivity in the next radiation image recording operation, which is to be performed on the stimulable phosphor sheet 1. The stimulable phosphor sheet erasing apparatus 100 still further comprises an erasing energy setting section 65 for adjusting a quantity of imparted erasing energy, which is to be imparted by the erasing section 50 to the stimulable phosphor sheet 1, by using both the energy level of the after-readout radiation energy remaining on the stimulable phosphor sheet, which energy level has been detected by the residual radiation energy detecting section 55, and the image recording sensitivity in the next radiation image recording operation, which image recording sensitivity has been acquired by the sensitivity acquiring section 60.

The erasing energy setting section 65 adjusts the quantity of the imparted erasing energy, which is to be imparted to the stimulable phosphor sheet 1, such that the ratio of the energy level of the radiation energy, which is expected to remain on the stimulable phosphor sheet 1 after the erasing operation has been performed on the stimulable phosphor sheet 1, to the energy level of the radiation energy, which is expected to be stored on the stimulable phosphor sheet 1 with the next radiation image recording operation, may become equal to a predetermined ratio. Specifically, the erasing energy setting section 65 adjusts the quantity of the imparted erasing energy, which is to be imparted to the stimulable phosphor sheet 1, such that the ratio of the energy level of the after-erasing radiation energy to the energy level of the radiation energy, which is expected to be stored on the stimulable phosphor sheet 1 with the next radiation image recording operation, may fall within an appropriate erasing ratio range. How the quantity of the imparted erasing energy is adjusted will be described later.

As described above, the appropriate erasing ratio range described above is set such that the radiation image, which is reproduced from the image signal having been read out from the stimulable phosphor sheet 1 having been subjected to the next radiation image recording operation, may be substantially free from a residual image, and such that the after-readout radiation energy remaining on the stimulable phosphor sheet 1 may not be erased excessively.

As described above, the energy level of the after-erasing radiation energy described above is the energy level of the residual radiation energy remaining even further on the stimulable phosphor sheet 1 after the erasing operation has been performed on the stimulable phosphor sheet 1. The energy level of the after-erasing radiation energy described above is also the energy level of the residual radiation energy remaining on the stimulable phosphor sheet 1 at the time at which the next radiation image recording operation is to be performed on the stimulable phosphor sheet 1.

The residual radiation energy detecting section 55 receives the image signal, which has been read out and outputted by the radiation image acquiring section 20. The residual radiation energy detecting section 55 detects a maximum value of the energy levels of the after-readout radiation energy remaining on the stimulable phosphor sheet 1 and stores the information representing the detected maximum value.

The energy level of the after-readout radiation energy remaining on the stimulable phosphor sheet 1 is capable of being calculated accurately by use of values of image signal components of the image signal, which has been read out and outputted by the radiation image acquiring section 20, the quantities of the stimulating rays Le having been irradiated to pixels on the stimulable phosphor sheet 1, which pixels correspond to the image signal components of the image signal, during the image read-out operation, radiation energy releasing characteristics of the stimulable phosphor sheet 1, and the like. Alternatively, the values of the image signal components of the image signal, which has been read out and outputted by the radiation image acquiring section 20, may be employed as the values representing the energy level of the after-readout radiation energy remaining on the stimulable phosphor sheet 1.

The residual radiation energy detecting section 55 is constituted in the manner described above. Alternatively, in lieu of the residual radiation energy detecting section 55, there may be employed, for example, a residual radiation energy detecting section comprising (a) stimulating ray irradiating means, (b) read-out means for reading out the light, which is emitted by the stimulable phosphor sheet 1 when the stimulable phosphor sheet 1 is exposed to a comparatively small quantity of stimulating rays having been radiated out from the stimulating ray irradiating means, in order to acquire an image signal, and (c) maximum value calculating means for calculating the maximum value of the energy levels of the after-readout radiation energy, which remains on the stimulable phosphor sheet 1, in accordance with the thus acquired image signal in the same manner as that described above.

The stimulable phosphor sheet erasing apparatus 100 also comprises a saturation judging section 39. The saturation judging section 39 receives the image signal, which has been outputted from the radiation image acquiring section 20. The saturation judging section 39 also makes a judgment as to whether saturation has been or has not been reached with the value of the image signal, i.e. as to whether the quantity of the light Ke emitted by the stimulable phosphor sheet 1 is or is not beyond the readable range of the read-out section 25. In cases where it has been judged that saturation has been reached with the value of the image signal, the saturation judging section 39 outputs a re-readout instructing signal R.

The radiation image acquiring section 20 and the erasing section 50 are reciprocally moved (up and down in the cases of FIG. 1) by a vertical movement actuating section 31 of the radiation image recording and reproducing system 200. Specifically, the radiation image acquiring section 20 and the erasing section 50 are reciprocally moved in a sub-scanning direction (indicated by the arrow Y in FIG. 1), which is normal to the main scanning direction, and along the surface of the stimulable phosphor sheet 1. In this embodiment, the radiation image acquiring section 20 and the erasing section 50 are combined into an integral body and constituted as a read-out and erasing unit 30. Alternatively, the vertical movement actuating section 31 may be constituted such that the reciprocal movement of the radiation image acquiring section 20 in the sub-scanning direction and the reciprocal movement of the erasing section 50 in the sub-scanning direction are performed as two independent movements.

The radiation image recording and reproducing system 200 still further comprises a controller 35, which performs control of the information and the operations of the entire system. The radiation image recording and reproducing system 200 also comprises an ID reading section 33 for reading ID information from an ID card 11 for each of various different objects.

How the radiation image recording and reproducing system 200 operates will be described hereinbelow with reference to FIG. 2.

As illustrated in FIG. 2, in a step (1), the ID information represented by a bar code having been printed on the ID card 11 for an object M2, whose image is to be recorded on the stimulable phosphor sheet 1 with the next radiation image recording operation, is read by the ID reading section 33. The ID information, which has been read by the ID reading section 33, is fed into the controller 35 and the sensitivity acquiring section 60. In accordance with the received ID information, the controller 35 acquires an image recording menu of the radiation image recording operation, which is to be performed on the object M2, from a data base storing section 40, which is located at the exterior of the radiation image recording and reproducing system 200. Also, in a step (2), in accordance with the received ID information, the sensitivity acquiring section 60 acquires a value Rs2 of the image recording sensitivity in the next radiation image recording operation, which is to be performed on the object M2, from the image recording menu of the radiation image recording operation, which is to be performed on the object M2, the image recording menu having been stored on the data base storing section 40.

Thereafter, in a step (3), the erasing energy setting section 65 adjusts the quantity of the imparted erasing energy, which is to be imparted by the erasing section 50 to the stimulable phosphor sheet 1. Specifically, the erasing energy setting section 65 receives the information, which represents a value E1 of the maximum energy level of the residual radiation energy remaining on the stimulable phosphor sheet 1, from the residual radiation energy detecting section 55. The value E1 will be described later. The erasing energy setting section 65 also receives the information representing the value Rs2 of the image recording sensitivity in the next radiation image recording operation, which is to be performed on the object M2, from the sensitivity acquiring section 60. In accordance with the value E1 of the maximum energy level of the residual radiation energy remaining on the stimulable phosphor sheet 1 and the value Rs2 of the image recording sensitivity in the next radiation image recording operation, which is to be performed on the object M2, the erasing energy setting section 65 makes reference to a data table, which has been stored in the erasing energy setting section 65 and which will be described later, and adjusts a quantity F1 of the imparted erasing energy, which is to be imparted by the erasing section 50 to the stimulable phosphor sheet 1 at the time of the erasing of the after-readout radiation energy described above remaining on the stimulable phosphor sheet 1.

Thereafter, in a step (4), the read-out and erasing unit 30, which has been moved to a predetermined stop position (on a top dead position side or a bottom dead position side) during the image read-out operation performed after the radiation image recording operation has been performed on the object M1, is moved reversely. During the reverse movement of the read-out and erasing unit 30, the erasing section 50 of the read-out and erasing unit 30 irradiates the erasing light Lg to the stimulable phosphor sheet 1, such that the quantity F1 of the imparted erasing energy, which quantity has been adjusted by the erasing energy setting section 65 in the manner described above, may be imparted to the stimulable phosphor sheet 1. The after-readout radiation energy remaining on the stimulable phosphor sheet 1 is thereby released from the stimulable phosphor sheet 1. As a result, the stimulable phosphor sheet 1 having thus been erased becomes capable of being used for the next radiation image recording operation, which is to be performed on the object M2.

As described above, the residual radiation energy detecting section 55 acquires the value E1 of the maximum energy level of the residual radiation energy remaining on the stimulable phosphor sheet 1. How the residual radiation energy detecting section 55 acquires the value E1 in accordance with the radiation image recording operation, which has been performed most recently on the object M1 before the next radiation image recording operation is performed on the object M2.

Specifically, in a step (5), the controller 35 feeds the information representing a value Rs1 of the image recording sensitivity, which value is contained in the image recording menu having been inputted for the radiation image recording operation performed on the object M1, into the radiation irradiating section 10. The radiation irradiating section 10 irradiates a quantity of the radiation, which quantity corresponds to the value Rs1 of the image recording sensitivity described above, to the object M1. The radiation, which has been radiated out from the radiation irradiating section 10 to the object M1 and which carries the image information of the object M1, is irradiated to the stimulable phosphor sheet 1, and the amount of the radiation energy in proportion to the aforesaid radiation carrying the image information of the object M1 is stored on the stimulable phosphor sheet 1. In this manner, the radiation image recording operation is performed on the object M1.

Thereafter, in a step (6), the radiation image of the object M1 having been stored on the stimulable phosphor sheet 1 is read out from the stimulable phosphor sheet 1. Specifically, the read-out and erasing unit 30, which is located at the predetermined stop position (on the top dead position side or the bottom dead position side), is moved reversely by the vertical movement actuating section 31. During the movement of the read-out and erasing unit 30, the stimulating rays Le, which are radiated out from the stimulating ray irradiating section 21, are irradiated to the linear region of the stimulable phosphor sheet 1, which linear region extends along the main scanning direction. Also, the light Ke, which is emitted by the stimulable phosphor sheet 1 when the stimulable phosphor sheet 1 is exposed to the stimulating rays Le, is received by the read-out section 25 and subjected to the photoelectric conversion. The analog signal obtained from the photoelectric conversion is subjected to the analog-to-digital conversion. The thus obtained digital image signal is outputted from the read-out section 25.

The image signal having thus been read out and outputted is transmitted to the data base storing section 40 and stored in the database storing section 40. Alternatively, the image signal may be transmitted to an external image processing unit and subjected to image processing performed by the image processing unit. Also, in a step (7), the image signal having been outputted from the read-out section 25 is fed into the saturation judging section 39. The saturation judging section 39 makes the judgment as to whether saturation has been or has not been reached with the value of the image signal. In cases where it has been judged that saturation has been reached with the value of the image signal, the saturation judging section 39 feeds the re-readout instructing signal R into the controller 35. In cases where it has been judged that saturation has not been reached with the value of the image signal, the image signal having been outputted from the read-out section 25 is fed into the residual radiation energy detecting section 55.

In cases where saturation has been reached with the value of the image signal, the accurate detection of the energy level of the after-readout radiation energy remaining on the stimulable phosphor sheet 1 is not capable of being made. Therefore, in such cases, in a step (7'), the controller 35, which has received the re-readout instructing signal R from the saturation judging section 39, alters the setting such that the detected quantity of the light Ke, which is emitted by the stimulable phosphor sheet 1 during the image read-out operation performed by the radiation image acquiring section 20, may become small. Also, in the step (6), in accordance with the thus altered setting, the image read-out operation is again performed on the stimulable phosphor sheet 1. For example, the quantity of the stimulating rays Le radiated out from the stimulating ray irradiating section 21 may be set to be small. Alternatively, the speed of the movement of the read-out and erasing unit 30 performed by the vertical movement actuating section 31 may be set to be high. In this manner, the image read-out operation is performed such that saturation may not be reached with the value of the image signal.

As described above, in cases where it has been judged that saturation has not been reached with the value of the image signal, the image signal having been outputted from the read-out section 25 is fed into the residual radiation energy detecting section 55. In a step (8), in accordance with the received image signal, the residual radiation energy detecting section 55 detects the value E1 of the maximum energy level of the residual radiation energy remaining on the stimulable phosphor sheet 1, which value is the maximum value of the energy levels of the after-readout radiation energy remaining on the stimulable phosphor sheet 1. The residual radiation energy detecting section 55 stores the information representing the thus detected value E1 of the maximum energy level of the residual radiation energy remaining on the stimulable phosphor sheet 1.

In the step (3), the thus detected value E1 of the maximum energy level of the residual radiation energy remaining on the stimulable phosphor sheet 1 is used for the adjustment of the quantity F1 of the imparted erasing energy, which is to be imparted by the erasing section 50 to the stimulable phosphor sheet 1 during the erasing operation performed on the stimulable phosphor sheet 1 before the next radiation image recording operation is performed on the object M2.

With the procedure described above, the erasing operation is performed on the stimulable phosphor sheet 1.

How the quantity of the imparted erasing energy is set by the erasing energy setting section 65 will be described hereinbelow in more detail.

FIG. 3 is a graph showing a content of an example of a data table, which is utilized for adjusting the quantity of the imparted erasing energy in accordance with the image recording sensitivity in the next radiation image recording operation, which is to be performed on the stimulable phosphor sheet, and the value of the maximum energy level of the residual radiation energy remaining on the stimulable phosphor sheet. In FIG. 3, the quantity of the imparted erasing energy is plotted on a vertical axis F, and the maximum energy level of the residual radiation energy remaining on the stimulable phosphor sheet 1 is plotted on a horizontal axis E. Reference is made to the image recording sensitivity in the next radiation image recording operation, which is to be performed on the stimulable phosphor sheet 1, and the value of the maximum energy level of the residual radiation energy remaining on the stimulable phosphor sheet 1, and the quantity of the imparted erasing energy, which is to be imparted to the stimulable phosphor sheet 1, is thereby calculated. The relationship represented by the graph of FIG. 3 has been stored in the erasing energy setting section 65. Specifically, the erasing energy setting section 65 stores previously the data table represented by the graph of FIG. 3. With respect to each of various different image recording sensitivities, the data table represents the relationship between the maximum energy level of the residual radiation energy remaining on the stimulable phosphor sheet 1 and the quantity of the imparted erasing energy to be imparted to the stimulable phosphor sheet 1, such that the ratio of the energy level of the radiation energy (i.e., the energy level of the after-erasing radiation energy), which is expected to remain even further on the stimulable phosphor sheet 1 after the after-readout radiation energy remaining on the stimulable phosphor sheet 1 has been erased, to the energy level of the radiation energy, which is expected to be stored on the stimulable phosphor sheet 1 with the next radiation image recording operation, may fall within the appropriate erasing ratio range described above.

In accordance with the value of the maximum energy level of the residual radiation energy remaining on the stimulable phosphor sheet 1, which value has been acquired from the residual radiation energy detecting section 55 described above, and the value of the image recording sensitivity in the next radiation image recording operation, which value has been acquired from the sensitivity acquiring section 60, the erasing energy setting section 65 makes reference to the data table described above and adjusts the quantity of the imparted erasing energy, which is to be imparted by the erasing section 50 to the stimulable phosphor sheet 1 at the time of the erasing of the after-readout radiation energy described above remaining on the stimulable phosphor sheet 1.

For example, in cases where the image recording sensitivity in the next radiation image recording operation, which is to be performed on the stimulable phosphor sheet 1, is a low sensitivity (e.g., the value of the image recording sensitivity is equal to RS200), the quantity of the imparted erasing energy, which is to be radiated out from the erasing section 50, is adjusted in accordance with the line indicated by L1 in FIG. 3. For example, in cases where the value of the maximum energy level of the residual radiation energy remaining on the stimulable phosphor sheet 1 is equal to E1, a value of F1 is calculated as the quantity of the imparted erasing energy. As the value of the maximum energy level of the residual radiation energy remaining on the stimulable phosphor sheet 1 becomes large, the quantity of the imparted erasing energy is adjusted to be large.

Also, in cases where the image recording sensitivity in the next radiation image recording operation, which is to be performed on the stimulable phosphor sheet 1, is a high sensitivity (e.g., the value of the image recording sensitivity is equal to RS800), the energy level of the radiation energy, which is expected to be stored on the stimulable phosphor sheet 1 with the next radiation image recording operation, is lower than the energy level of the radiation energy, which is expected to be stored on the stimulable phosphor sheet 1 in cases where the image recording sensitivity is the low sensitivity. In such cases, the quantity of the imparted erasing energy, which is to be radiated out from the erasing section 50, is adjusted in accordance with the line indicated by H1 in FIG. 3. As will be found from FIG. 3, the line H1 represents the quantities of the imparted erasing energy, which quantities are larger as a whole than the quantities of the imparted erasing energy represented by the line L1. Also, the inclination of the line H1 is sharper than the inclination of the line L1. For example, in cases where the value of the maximum energy level of the residual radiation energy remaining on the stimulable phosphor sheet 1 is equal to E2, a value of F2 is calculated as the quantity of the imparted erasing energy. In both the cases where the image recording sensitivity is the low sensitivity and the cases where the image recording sensitivity is the high sensitivity, as the value of the maximum energy level of the residual radiation energy remaining on the stimulable phosphor sheet 1 becomes large, the quantity of the imparted erasing energy is adjusted to be large.

In the cases of the data table illustrated in FIG. 3, the quantity of the imparted erasing energy is altered in the continuous pattern with respect to the values of the maximum energy level of the residual radiation energy remaining on the stimulable phosphor sheet 1. Alternatively, as illustrated in FIG. 4, the values of the maximum energy level of the residual radiation energy remaining on the stimulable phosphor sheet 1 may be classified into three regions J1, J2, and J3. Also, with respect to each of the image recording sensitivity of RS200 (represented by L2 in FIG. 4) and the image recording sensitivity of RS800 (represented by H2 in FIG. 4), the quantity of the imparted erasing energy may be set at a predetermined value with respect to each of the regions J1, J2, and J3. Specifically, the data table may be employed, in which the quantity of the imparted erasing energy is altered in stages with respect to the value of the maximum energy level of the residual radiation energy remaining on the stimulable phosphor sheet 1.

As another alternative, a data table may be employed for each of at least three image recording sensitivities (e.g., RS800, RS400, and RS200).

Figure 5:
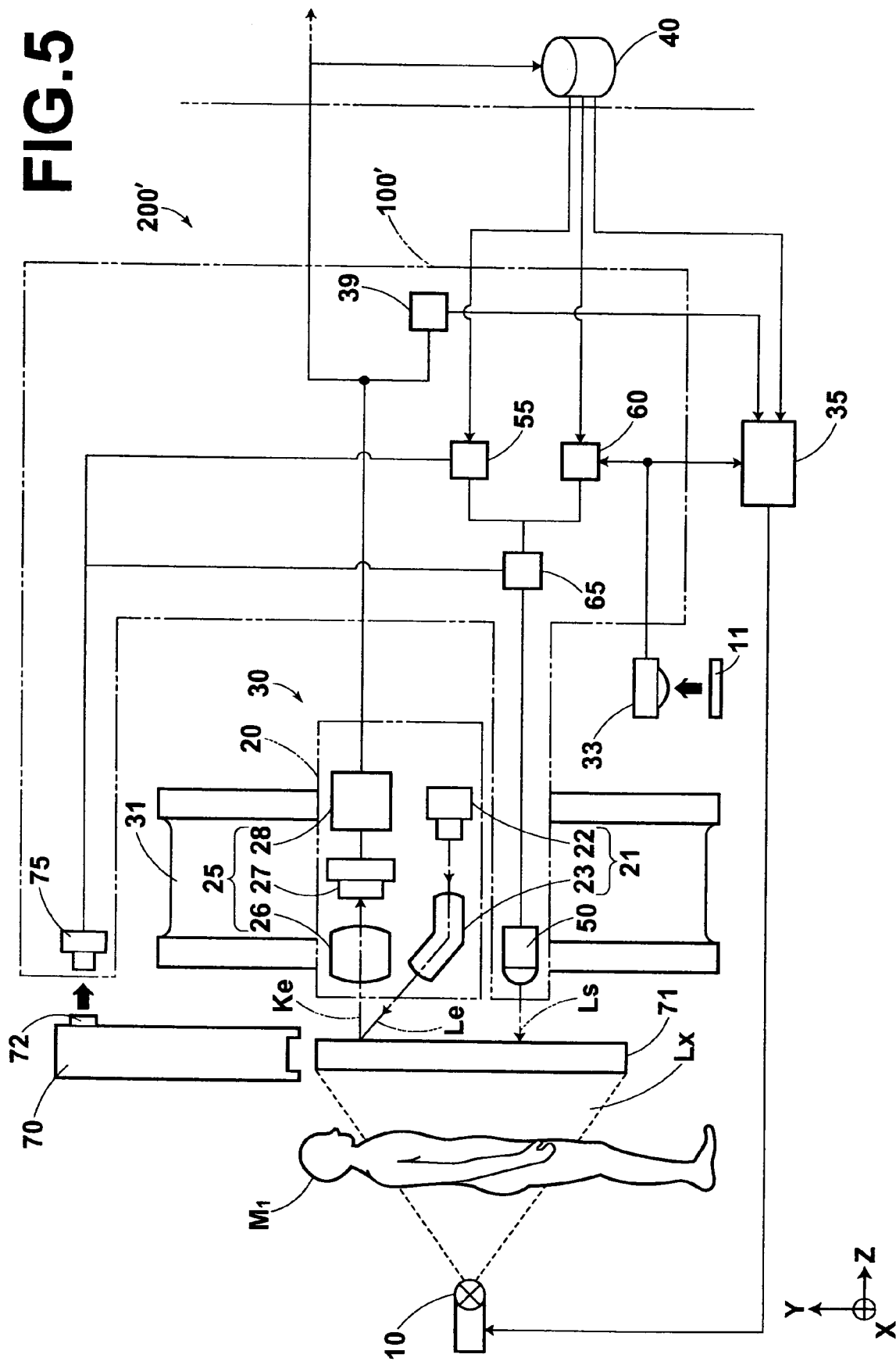
FIG. 5 is a schematic view showing a different example of a radiation image recording and reproducing system, in which a radiation image recording operation is performed by use of a cassette, and in which an embodiment of the stimulable phosphor sheet erasing apparatus in accordance with the present invention is employed.

FIG. 5 is a schematic view showing a different example of a radiation image recording and reproducing system 200', in which a radiation image recording operation is performed by use of a cassette, and in which a stimulable phosphor sheet erasing apparatus 100' acting as an embodiment of the stimulable phosphor sheet erasing apparatus in accordance with the present invention is employed. In FIG. 5, similar elements are numbered with the same reference numerals with respect to FIG. 1. As illustrated in FIG. 5, in the radiation image recording and reproducing system 200', in lieu of the stimulable phosphor sheet 1 described above, a stimulable phosphor sheet 71, which is furnished by being accommodated within a cassette 70, is employed. In this embodiment, the stimulable phosphor sheet erasing apparatus 100' is provided with a reading section 75 for reading the information representing by a bar code 72, which is attached to the cassette 70. The erasing energy setting section 65 receives the information, which is represented by the bar code 72, from the reading section 75. Also, the erasing energy setting section 65 discriminates the kind of the stimulable phosphor sheet 71 in accordance with the received bar code information and selects a data table, which corresponds to the discriminated kind of the stimulable phosphor sheet 71, from data tables having been stored previously in the erasing energy setting section 65. Further, the residual radiation energy detecting section 55 makes reference to the bar code information, which has been read by the reading section 75, and acquires an image signal representing a radiation image having been recorded with the radiation image recording operation, which have been performed most recently on the stimulable phosphor sheet 71, from the data base storing section 40. The residual radiation energy detecting section 55 also acquires the information representing the quantity of the stimulating rays delivered during the radiation image recording operation, which have been performed most recently on the stimulable phosphor sheet 71, and the like, from the data base storing section 40. The residual radiation energy detecting section 55 thus calculates the value of the maximum energy level of the residual radiation energy remaining on the stimulable phosphor sheet 71. In this manner, the erasing energy setting section 65 is capable of calculating an appropriate quantity of imparted erasing energy, which is to be imparted to the stimulable phosphor sheet 71. Also, the erasing of the after-readout radiation energy remaining on the stimulable phosphor sheet 71 is capable of being performed in the same manner as that described above.

In each of the embodiments described above, the stimulable phosphor sheet erasing apparatus in accordance with the present invention is built in the radiation image recording and reproducing system. Alternatively, the stimulable phosphor sheet erasing apparatus in accordance with the present invention may be constituted as an apparatus for exclusive use for the erasing of a stimulable phosphor sheet, which apparatus is separate from a radiation image recording and reproducing system.

Also, in each of the embodiments described above, the erasing energy setting section 65 adjusts the quantity of the imparted erasing energy by use of the value of the maximum energy level of the residual radiation energy remaining on the stimulable phosphor sheet. As the value of the maximum energy level of the residual radiation energy remaining on the stimulable phosphor sheet, the value of the energy level of the after-readout radiation energy, which remains in a specific region of the stimulable phosphor sheet, may be utilized. Alternatively, as the value of the maximum energy level of the residual radiation energy remaining on the stimulable phosphor sheet, a value representing the energy level of the after-readout radiation energy, which remains on the stimulable phosphor sheet as a whole, may be utilized. For example, a mean value of the energy level of the after-readout radiation energy, which remains on the stimulable phosphor sheet as a whole, may be utilized.

In each of the embodiments described above, as the technique for reading out the radiation image from the stimulable phosphor sheet, the line scanning read-out technique is employed. With the line scanning read-out technique, the linear stimulating rays are irradiated to the stimulable phosphor sheet, on which the radiation image has been stored. Also, the radiation image read-out means is moved with respect to the stimulable phosphor sheet, and the limited emitted from a linear region of the stimulable phosphor sheet exposed to the linear stimulating rays is detected with the line sensor. Alternatively, as the technique for reading out the radiation image from the stimulable phosphor sheet, for example, a point scanning read-out technique may be employed. With the point scanning read-out technique, the stimulating rays are converged into a spot by use of, for example, a scanning optical system comprising a laser beam source and a rotating polygon mirror. The spot of the stimulating rays is irradiated to the stimulable phosphor sheet, and the stimulable phosphor sheet is moved with respect to the radiation image read-out means. Also, the light emitted as a light spot from the stimulable phosphor sheet is guided by a light guide member, which may be made from an acrylic material, or the like, into a photomultiplier tube (PMT).

The aforesaid high-sensitivity radiation image recording operation will be described hereinbelow in detail.

The high-sensitivity radiation image recording operation is an image recording mode, which is employed in cases where the radiation image recording operation is to be performed with a small radiation dose to the object, such as a pregnant woman or an infant. Ordinarily, the frequency of occurrence of the high-sensitivity radiation image recording operation is lower than the frequency of occurrence of the ordinary-sensitivity radiation image recording operation.

In the high-sensitivity radiation image recording operation, the quantity of the radiation impinging upon a region of the stimulable phosphor sheet, which region corresponds to a region of interest in the radiation image, becomes smaller than the quantity of the radiation impinging upon the region of the stimulable phosphor sheet at the time of the ordinary-sensitivity radiation image recording operation.

Also, the energy level of the residual radiation energy remaining on the stimulable phosphor sheet, which energy level is allowed for the stimulable phosphor sheet utilized for the high-sensitivity radiation image recording operation performed with the small radiation dose, becomes lower than the energy level of the residual radiation energy remaining on the stimulable phosphor sheet, which energy level is allowed for the stimulable phosphor sheet utilized for the ordinary-sensitivity radiation image recording operation performed with the radiation dose larger than the radiation dose employed in the high-sensitivity radiation image recording operation. Specifically, in cases where the radiation image of the object is to be stored on the stimulable phosphor sheet with the radiation image recording operation, it is necessary that, as the quantity of the radiation energy representing the radiation image of the object stored on the stimulable phosphor sheet becomes small, the quantity of the residual radiation energy remaining on the stimulable phosphor sheet before being subjected to the radiation image recording operation described above be set to be small.

However, in a broad sense, the term "high-sensitivity radiation image recording operation" means the cases wherein the quantity of the radiation, which impinges upon the region of the stimulable phosphor sheet corresponding to the region of interest in the radiation image, is smaller than the quantity of the radiation, which impinges upon the region of the stimulable phosphor sheet corresponding to the region of interest in the radiation image during the ordinary-sensitivity radiation image recording operation.

What is claimed is:

1. A stimulable phosphor sheet erasing method, in which residual radiation energy remaining on a stimulable phosphor sheet is erased such that the erased stimulable phosphor sheet becomes capable of being used for a next radiation image recording operation, the method comprising the steps of:

i) detecting an energy level of the residual radiation energy remaining on the stimulable phosphor sheet, ii) acquiring information representing an image recording sensitivity in the next radiation image recording operation, which is to be performed on the stimulable phosphor sheet, and iii) adjusting a quantity of imparted erasing energy, which is to be imparted to the stimulable phosphor sheet in order to erase the residual radiation energy remaining on the stimulable phosphor sheet, by use of both the image recording sensitivity in the next radiation image recording operation, which is to be performed on the stimulable phosphor sheet, and the energy level of the residual radiation energy remaining on the stimulable phosphor sheet, the quantity of the imparted erasing energy being adjusted such that, as the image recording sensitivity in the next radiation image recording operation, which is to be performed on the stimulable phosphor sheet, becomes high, and as the energy level of the residual radiation energy remaining on the stimulable phosphor sheet becomes high, the quantity of the imparted erasing energy is set to be large.

2. A method as defined in claim 1 wherein a maximum value of energy levels of the residual radiation energy remaining on the stimulable phosphor sheet is taken as the energy level of the residual radiation energy remaining on the stimulable phosphor sheet.

3. A method as defined in claim 2 wherein the quantity of the imparted erasing energy is adjusted in stages with respect to the image recording sensitivity in the next radiation image recording operation, which is to be performed on the stimulable phosphor sheet, and the energy level of the residual radiation energy remaining on the stimulable phosphor sheet.

4. A method as defined in claim 1 wherein the quantity of the imparted erasing energy is adjusted in stages with respect to the image recording sensitivity in the next radiation image recording operation, which is to be performed on the stimulable phosphor sheet, and the energy level of the residual radiation energy remaining on the stimulable phosphor sheet.

5. A stimulable phosphor sheet erasing apparatus, in which residual radiation energy remaining on a stimulable phosphor sheet is erased such that the erased stimulable phosphor sheet becomes capable of being used for a next radiation image recording operation, the apparatus comprising:

i) erasing energy imparting means for imparting erasing energy, which acts to erase the residual radiation energy remaining on the stimulable phosphor sheet, to the stimulable phosphor sheet, ii) detection means for detecting an energy level of the residual radiation energy remaining on the stimulable phosphor sheet, iii) sensitivity acquiring means for acquiring information representing an image recording sensitivity in the next radiation image recording operation, which is to be performed on the stimulable phosphor sheet, and iv) erasing energy setting means for adjusting a quantity of the imparted erasing energy, which is to be imparted by the erasing energy imparting means to the stimulable phosphor sheet, by use of both the image recording sensitivity in the next radiation image recording operation, which image recording sensitivity has been acquired by the sensitivity acquiring means, and the energy level of the residual radiation energy remaining on the stimulable phosphor sheet, which energy level has been detected by the detection means, the erasing energy setting means adjusting the quantity of the imparted erasing energy such that, as the image recording sensitivity in the next radiation image recording operation, which image recording sensitivity has been acquired by the sensitivity acquiring means, becomes high, and as the energy level of the residual radiation energy remaining on the stimulable phosphor sheet, which energy level has been detected by the detection means, becomes high, the quantity of the imparted erasing energy is set to be large.

6. An apparatus as defined in claim 5 wherein the detection means detects a maximum value of energy levels of the residual radiation energy remaining on the stimulable phosphor sheet and takes the detected maximum value as the energy level of the residual radiation energy remaining on the stimulable phosphor sheet.

7. An apparatus as defined in claim 6 wherein the erasing energy setting means adjusts the quantity of the imparted erasing energy in stages with respect to the image recording sensitivity in the next radiation image recording operation, which is to be performed on the stimulable phosphor sheet, and the energy level of the residual radiation energy remaining on the stimulable phosphor sheet.

8. An apparatus as defined in claim 6 wherein the erasing energy setting means is provided with a data table, which defines the quantity of the imparted erasing energy.

9. An apparatus as defined in claim 5 wherein the erasing energy setting means adjusts the quantity of the imparted erasing energy in stages with respect to the image recording sensitivity in the next radiation image recording operation, which is to be performed on the stimulable phosphor sheet, and the energy level of the residual radiation energy remaining on the stimulable phosphor sheet.

10. An apparatus as defined in claim 5 wherein the erasing energy setting means is provided with a data table, which defines the quantity of the imparted erasing energy.

* * * * *